Feb. 21, 1967       B. M. SINGLETON       3,304,657
SKIFF WINDSHIELD FOR BOATS
Filed Sept. 29, 1964                    4 Sheets-Sheet 1
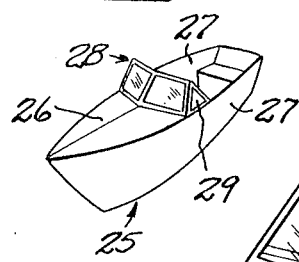
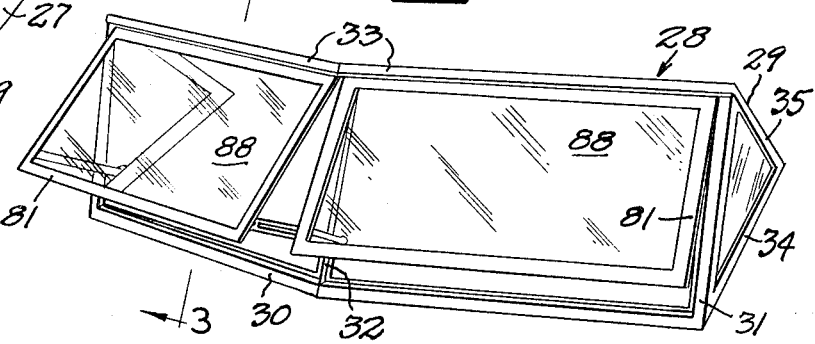
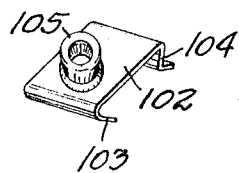
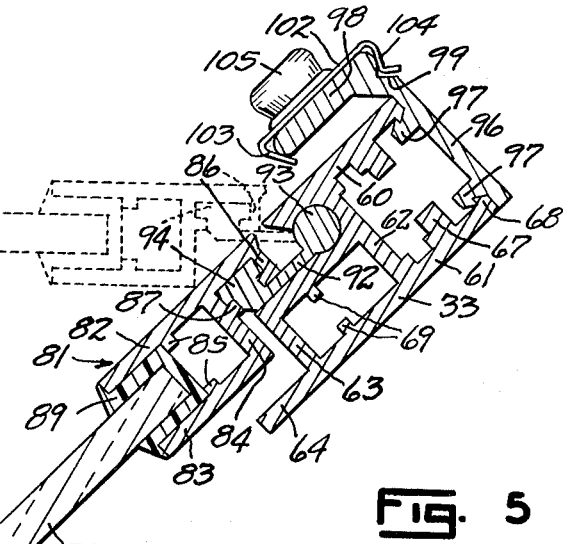
INVENTOR.
BENOIT M. SINGLETON
BY
Eugene C. Knoblock
ATTORNEY

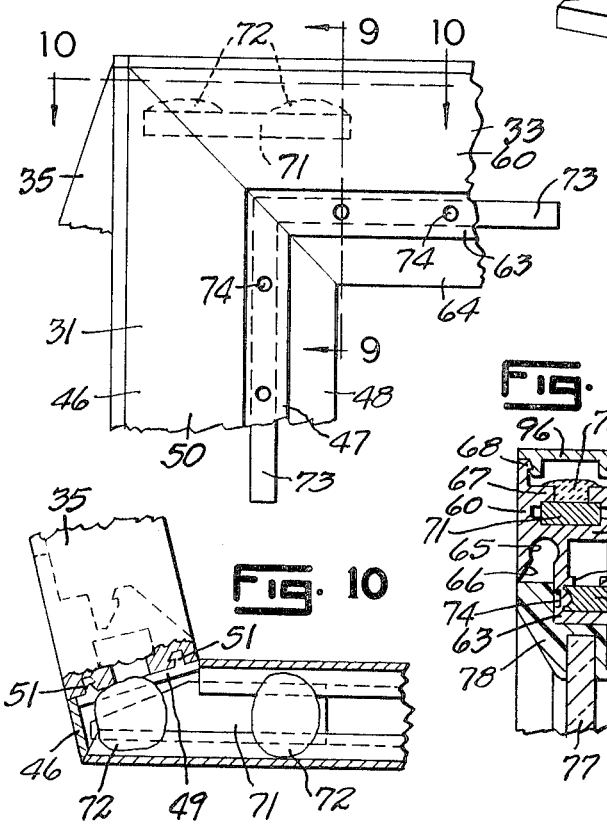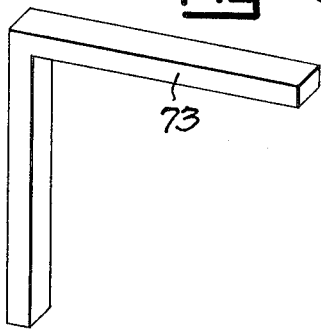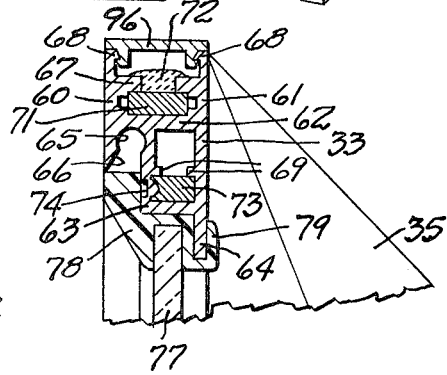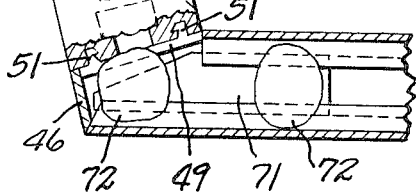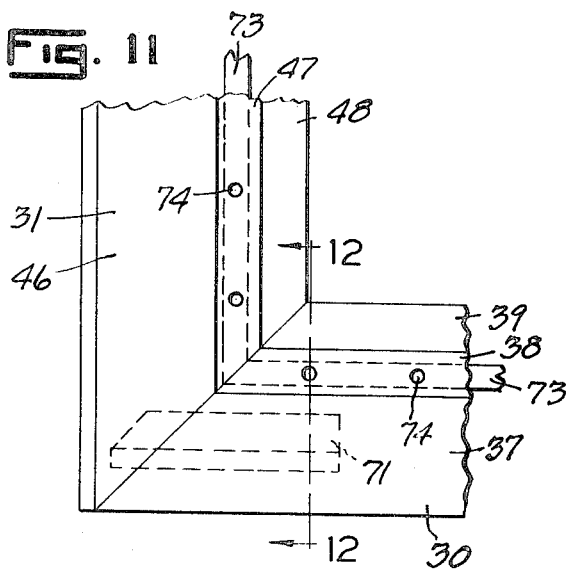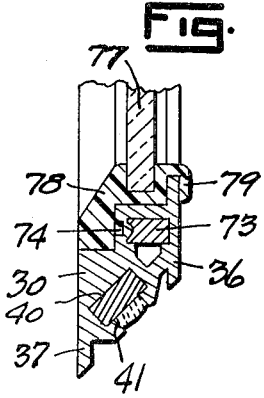
INVENTOR.
BENOIT M. SINGLETON
BY Eugene C. Knoblock
ATTORNEY

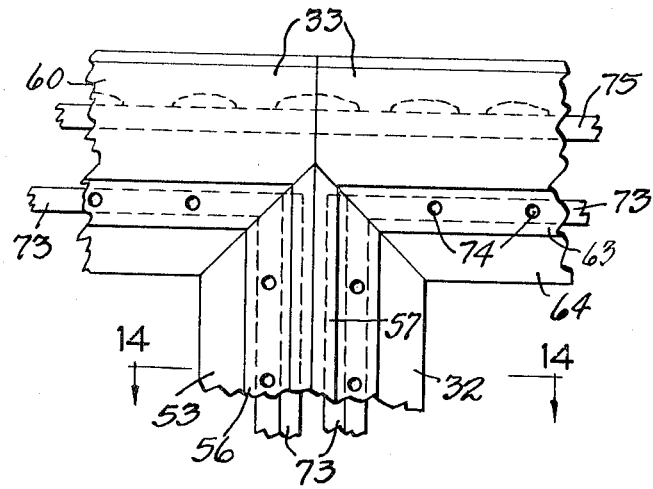
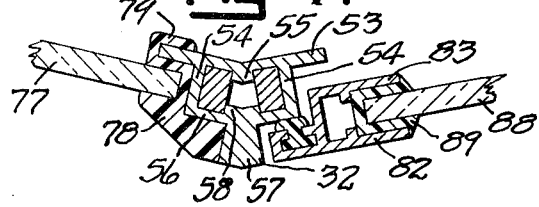
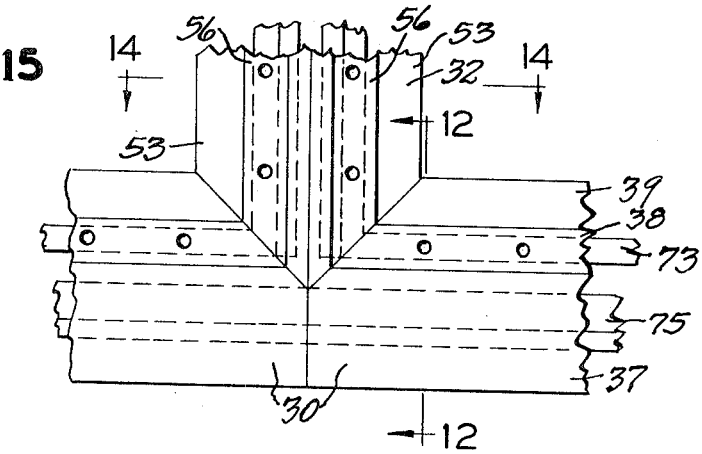

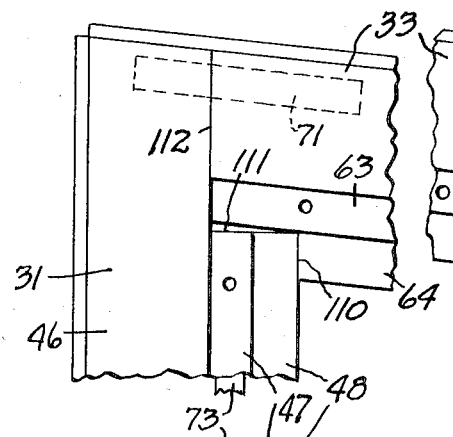
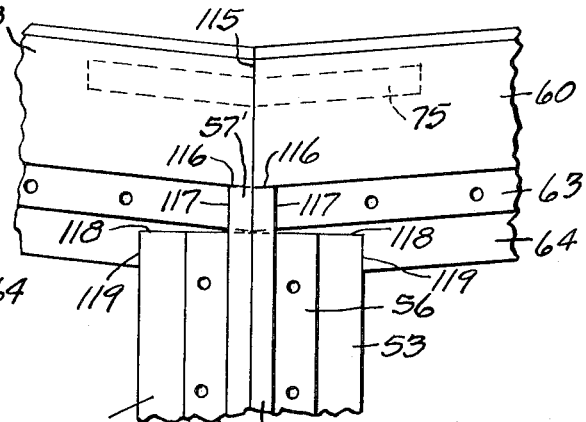
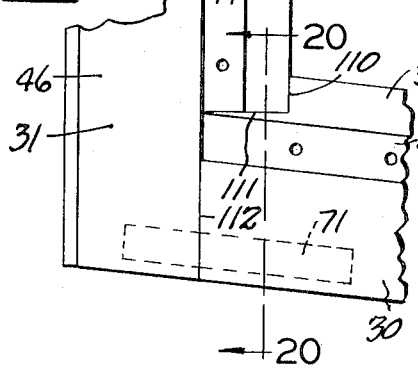
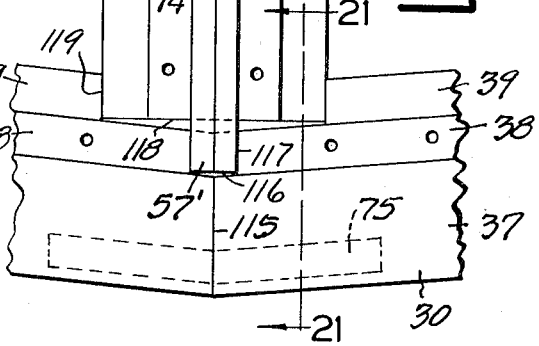
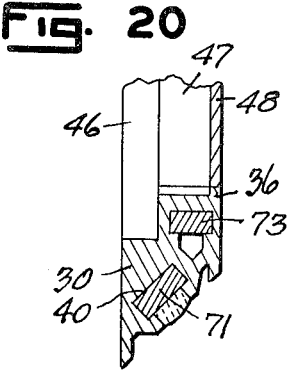
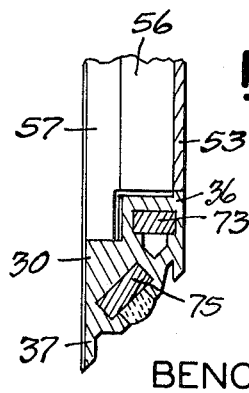

United States Patent Office 3,304,657
Patented Feb. 21, 1967

3,304,657
SKIFF WINDSHIELD FOR BOATS
Benoit M. Singleton, Goshen, Ind., assignor to O. S. Keene Company, Inc., Middlebury, Ind., a corporation of Indiana
Filed Sept. 29, 1964, Ser. No. 400,019
11 Claims. (Cl. 49—399)

This invention relates to improvements in skiff windshield for boats.

The primary object of this invention is to provide a skiff windshield for boats, which is formed of a plurality of parts of standard construction interconnected to provide a rigid structure of a size to fit skiffs of wide range of sizes and of many constructions.

A further object is to provide a skiff windshield construction having a novel combination and arrangement of parts to permit pivotal mounting of a windshield panel in the windshield frame and to permit ready removability of the windshield panel or sash from the frame and its replacement in the frame.

A further object is to provide a novel windshield skiff for boats which includes means providing for anchorage of a cover, such as a canvas top for the boat.

Other objects will be apparent from the following specification.

In the drawings:

FIG. 1 is a perspective view of a boat having my new windshield applied thereto;

FIG. 2 is a perspective view illustrating the windshield assembly, with the window panels thereof open;

FIG. 3 is an enlarged vertical sectional view taken on line 3—3 of FIG. 2;

FIG. 4 is a perspective view of a fastener clip used in the construction shown in FIG. 3;

FIG. 5 is a fragmentary vertical sectional view taken on line 3—3 of FIG. 2 and illustrating a top anchoring arrangement;

FIG. 6 is a fragmentary front elevational view of one corner portion of the frame of my improved windshield;

FIG. 7 is a perspective view of a key used in the construction shown in FIG. 6;

FIG. 8 is a perspective view of a second key used in the construction illustrated in FIG. 6;

FIG. 9 is a fragmentary transverse sectional view taken on line 9—9 of FIG. 6, and illustrating a fixed windshield panel mounted in the frame;

FIG. 10 is a fragmentary sectional view taken on line 10—10 of FIG. 6, and illustrating the corner between the windshield and a side wing frame;

FIG. 11 is a front elevation of a lower corner of the windshield frame;

FIG. 12 is a fragmentary sectional view taken on line 12—12 of FIG. 11;

FIG. 13 is a front elevational view of the center upper portion of the windshield frame;

FIG. 14 is a transverse sectional view taken on line 14—14 of FIG. 13, and illustrating one fixedly mounted windshield panel and one swinging windshield panel;

FIG. 15 is a front elevational view of the lower central part of the windshield frame;

FIG. 16 is a front elevational view of a corner of the windshield frame, illustrating another embodiment of the invention;

FIG. 17 is a front elevational view of the upper central portion of the windshield frame of the embodiment shown in FIG. 16;

FIG. 18 is a front elevational view of the lower corner of the windshield frame shown in FIG. 16;

FIG. 19 is a front elevational view of the lower central portion of the windshield frame;

FIG. 20 is a fragmentary transverse sectional view taken on line 20—20 of FIG. 18;

FIG. 21 is a fragmentary sectional view taken on line 21—21 of FIG. 19.

Referring to the drawings which illustrate the preferred embodiment of the invention, and particularly to FIGS. 1 to 15, inclusive, the numeral 25 designates a boat having a front deck portion 26 extending between the upper portions of the sides 27 at the front thereof forwardly of the rear passenger compartment. My new windshield frame unit 28 is adapted to be mounted upon the rear of the deck part 26 to extend thereacross and may include side wing parts 29 which extend rearwardly from the ends of the windshield frame and are mounted upon the upper edges of the sides 27 of the boat hull.

My windshield frame part preferably includes bottom frame parts 30, side frame parts 31, central frame part 32 and upper frame parts 33. The side wing parts preferably define a triangular side wing having a lower side frame part 34 and a rear upright side frame part 35. The various frame parts 30 to 35, inclusive, preferably constitute metal extrusions.

The bottom frame parts 30 are preferably of the construction seen at the lower part of FIG. 3, and are characterized by a unitary construction having an inner panel or wall 36 and a substantially parallel outer panel or wall 37, and a stepped upper configuration defining an intermediate longitudinal shoulder 38 and an inner longitudinal shoulder flange portion 39, the bottom surface of the bottom frame parts 30 extends at an angle to the parts 36 and 37, such as approximately forty-five degrees. The lower part of the bottom frame has a longitudinal groove 40 having a reduced dimension lower mouth portion 41. The bottom frame parts are anchored to the deck parts or panels 26 by stud members 42 screw-threaded at their opposite ends and having a shank portion extending through an opening in the deck panel 26. The groove 40 of each bottom frame part mounts a plurality of nuts 43 which are slidable therein and are adapted for screw-threaded reception of the upper ends of the stud members 42. Nuts 44 threaded on the lower exposed ends of the stud members 42 bear against washers 45 and press the same against the bottom of the deck panel 26 and serve to draw the bottom surfaces or edges of the bottom frame part firmly against the deck panel 26, as seen at the lower part of FIG. 3.

Each of the side frame parts 31 will preferably have a tubular outer body portion 46 of any suitable cross-sectional configuration and will have an inset longitudinal intermediate shoulder part 47 and an inner longitudinal shoulder flange 48. The rear wall 49 of tubular outer body portion 46 extends at an angle to the front surface 50 of tubular part 46 and has a pair of longitudinally extending ribs 51 each of hook shape in cross-section, as best seen in FIG. 10.

The central frame part 32 is preferably of the cross-sectional configuration illustrated in FIG. 14, being characterized by an inner V-shaped part 53 of symmetrical character, from the mid-point of the front surfaces of which extend diverging longitudinal walls 54, and from the center of which extends a longitudinal forward ridge 55. Inwardly converging walls 56 project from the free ends of the walls 54 and define an intermediate shoulder. A longitudinal forwardly projecting front rib 57 defines a part of the shoulder with the part 56 and also has an inwardly projecting part 58 rearward of the inner faces of the walls 56.

Each of the upper frame parts 33 is of a cross-sectional configuration, as illustrated in FIGS. 3, 5 and 9, and is characterized by an outer wall part 60, an inner wall part 61, an intermediate transverse wall part 62, a step-forming tube part 63 inset from the outer wall 60 and defined in part by the inner wall 61, with the flange 64 of the inner wall projecting beyond said tube part 63 to form an inner step or shoulder. Between the outer wall part 60 and the tube 63 is defined a longitudinal groove 65 having an inner cylindrical part and a flared throat 66. Inwardly projecting ribs 67 cooperate with walls 60 and 61 and with transverse walls 62 to define a socket, and the outermost margins of the walls 60 and 61 outwardly of the ribs 67 are characterized by inwardly projecting longitudinal hooks 68. The interor of the tubular portion 63 has longitudinal projecting ribs 69.

The frame parts 30, 31, 32 and 33 are interconnected rigidly to each other to define a strong frame. Each joint between adjacent frame parts is characterized by an inner key and an outer key. In the construction illustrated in FIGS. 1 to 15, inclusive, the joints at corners are preferably formed by mitering the ends of the joint-forming parts, as best seen in FIGS. 6 and 11. In each instance a comparatively short outer key 71 spans the mitered joint adjacent the outer margin of the joined frame parts and is welded thereto. Thus the outer key 71 at the upper frame part and the side parts is seated in a snug pocket defined between the intermediate transverse wall 62 and the inward projecting ribs 67 of the upper frame part 33, and projects into the tubular part 46 of the side frame part 31. Welds 72 serve to secure the key 71 to both frame parts 33 and 31, as seen in FIG. 6. Key 71 is also mounted within a keyway within the configuration of the intermediate longitudinal shoulder 38 of the bottom frame part 30 and is welded to the bottom frame part 30 and a side frame 31 at the lower frame corner, as illustrated in FIG. 11. An L-shaped key 73 has one leg thereof inserted in a keyway of each of the corner defining frame members. Thus in FIG. 9 the keyway is defined as being formed in the upper frame part 33 at the tubular stepped tube 63 and within the ribs 69. A similar keyway is formed in each side frame member 31 at the inset longitudinal intermediate shoulder 47 thereof. The key 77 is anchored to the frame parts 11, 33 and 30 at the respective corners in any suitable manner, for example, by means of spot welds or of punch indentations at 74.

The interconnection of angularly extending bottom frame parts 30 to one another, the interconnection of upper frame parts 30 extending angularly to each other in end to end relation, and the connection of the central frame parts 32, is best illustrated in FIGS. 13 and 15, in which it will be seen that the ends of the central frame part 32 are cut to V-shape, and the adjacent ends of the lower frame members 30 and of the upper frame parts 33 abut for a part of their thickness and are cut away angularly for edge abutment with end surfaces of the center frame parts 32 for the remainder of their thickness. Elongated key members 75 connect the upper frame parts 33 at the upper part thereof, and the lower frame members 30 at the lower part thereof, as seen in FIG. 13, and are preferably welded in place. The L-shaped keys 73 are used in the manner described above to connect each frame part 33 to the adjacent end part at the central frame member 32, and are then spot welded or anchored by punching at 74.

The construction of the frame so provided is strong, is firmly anchored to the boat deck, and the parts at each side of the center of the structure are coplanar. Thus an intermediate shoulder extending in a single plane is defined by parts 38 of the bottom frame, parts 47 of the side frame, parts 56 of the center frame, and one surface of the step-forming tube 63. Similarly, flange parts 39 of the bottom member, 48 of the side members, 64 of the upper member and 53 of the central member are coplanar.

The side wing members 29 are formed of frame parts 34 and 35 of any desired cross-sectional configuration, and are cut at their ends in mitred relation to define side wings of desired shape. These units may include key-receiving internal sockets, and at their ends are preferably provided with grooves having interlocking engagement with the side frame members 31 as at the longitudinal ribs 51 of the latter, as illustrated in FIG. 10.

The frame may mount panels spanning the same in fixed relation thereto, as illustrated in FIGS. 9 and 12, wherein a glass panel 77 spans one part of the frame and is anchored thereto by a preformed flexible resilient molding strip 78 having a stepped contour to fit against the stepped shape of the adjacent frame member and having an anchoring lip 79 held in place by fitting over a flange, such as the flange 64 as seen in FIG. 9. The mold strip 78 has a groove therein which receives the marginal portion of the glass panel to retain the same. It will be observed that the mold strip 78 may be applied at each of the frame parts 30, 31, 32 and 33 with the interfit of the parts being illustrated at FIGS. 9, 12 and 14, with respect to each of the frame members except the side member 31.

One of the characteristics of the windshield construction is that it may include pivotally mounted windshield panels, such as are illustrated in FIGS. 2 and 3 and at the right in FIG. 14. Swinging windshield panels of this construction preferably have frame members or sash members 81 extending therearound. In the preferred construction these frame members are of similar extruded configuration and are suitably interconnected at their corners or joints by the use of keys or by welding or by any other suitable means. The sash frame members are preferably unitary extrusions and are characterized by an outer wall 82, an inner wall 83 of narrower width joined at the cross flange or wall 84 at the outer margin to intermediate part of the outer wall 82. Longitudinal internal ribs 85 form stops spaced inwardly from the wall 84. An outer flange 86 projects inwardly from the outer margin of the outer wall 82. Cooperating ribs 87 projecting toward each other and formed on wall 84 and flange 86 cooperate to define a T-slot. Glass panel 88 spans the sash frame members with its margins seating in the inner portion thereof within U-shaped resilient binder or sealing members 89 which fit snugly between the walls 82 and 83 and preferably abut at their inner ends the ribs 85. The free margins of the sash frame preferably carry abutment or sealing strips 90 which are anchored in the T-slot defined by parts 82, 84, 86 and 87, and which project beyond the free ends of the flanges 86 for abutment with the windshield frame parts as at the central member 32, as seen in FIG. 14, at the bottom member 30 as seen in FIG. 3, and at a side frame member 31.

Each sash frame is pivoted at one margin thereof, as at the top as illustrated in FIG. 3, to the windshield frame by means of a knuckle strip or member 92, which preferably extends substantially coextensively with the hinged margin of the sash. Each knuckle strip has a cylindrical knuckle 93 at one longitudinal margin thereof, whose dimensions accommodate snug rocking fit thereof within a part-cylindrical groove 65 of a frame member, such as the upper frame part 33 as illustrated. It will be noted that this groove has a flared mouth which accommodates swinging of the sash frame through a predetermined angle, as illustrated in FIG. 3, from its normal closed position. Preferably, the extent of swinging movement is such that the sash frame may be swung completely clear of the windshield frame, as illustrated in dotted lines in FIG. 3. The opposite longitudinal margin of the knuckle strip carries a laterally offset to shaped key which has a sliding fit in the key groove defined by the parts 82, 84, 86 and 87 of the adjacent sash frame member, as seen in FIG. 3. One of the ends of the sash frame, preferably the inner end thereof, has formed therein a slot (not shown) aligned with and corresponding to the shape of the T-shaped slot which receives the key 94. By means of this arrangement, it is possible to assemble the knuckle strip 92 within the windshield frame as the parts thereof are being constructed and to assemble the sash frames independently and then to interconnect them by holding the sash frame in the dotted line position shown in FIG. 3, and passing the T-slot of the sash frame longitudinally along the T-shaped key 94 until the sash is in proper registered position with the windshield frame opening. Thereupon the parts will be held assembled and against disassembly as long as a part of the sash frame remains within the outline of the windshield frame, that is, as long as the sash is not opened to the full extent illustrated in dotted lines in FIG. 3.

The aforementioned mounting of the window sash frame for pivoting permits adequate clearance between the knuckle and the socket for insurance of free pivotal movement without danger of disconnection of the knuckle from its socket. Likewise, the knuckle cannot bind or crawl when the window sash frame is partly open. The knuckle remains in place at all times during assembly and removal of the window sash from the windshield frame. These characteristics constitute distinctive improvements over prior boat windshield constructions which were commonly characterized by hinged knuckles with opposed parallel flat faces to permit the assembly of the knuckle into a groove and its removal therefrom at a certain position, and which by that token entailed the risk of disassembly if accidental positioning of the parts at the release position occurs during usage.

The exposed marginal portions, such as the upper margin of the upper frame member 33, may be closed by cap strips 96 which extend across and span the free or upper edges of the walls 60 and 61 and which have longitudinal spaced hook flanges 97 which interlock with longitudinal hook flanges 68 upon the frame part 33. In one form the cap strip 96 is of a width greater than the thickness of the frame 33 and projects outwardly therefrom and terminates in a flange 98 extending downwardly from the cap in outwardly spaced relation to the outer wall 60 of the member 33. A groove 99 is preferably formed in the cap strip 96 adjacent the flange 98. The flange 98 may provide means for connection of the front end of a fabric top 100. Thus in FIG. 5 is illustrated a construction in which the fabric top 100 has a marginal strip 101 secured thereto and adapted to fit snugly in the groove defined between the parts 60 and 98 with the fabric projecting therefrom and thence around or over the flange 98 and thence rearwardly. An alternative arrangement may be provided for anchoring the margin of a top 100 when the same is provided with snap fasteners. In this case clips 102 may be mounted upon the flange 98 in spaced relation. Each clip 102 has a flange 103 extending at an acute angle thereto and fitting around the free margin of flange 98. A V-shaped spring flange 104 projects from the oposite margin of the clip 102 and seats in the groove 99, as illustrated in FIG. 3. The clip 102 mounts a snap fastener part 105 which is adapted to be engaged releasably by a mating snap fastener part carried by the fabric top 100.

An alternative construction of the windshield frame is illustrated in FIGS. 16, 17, 18 and 19 and utilizes parts of the same cross-sectional configuration as the parts 30, 31, 32 and 33 previously described. This alternative construction has been found to be superior to the bevel or mitre joint between frame parts in some particulars. In this regard attention is directed to the fact that the parts of the frame which are interconnected extend at angles different than ninety degrees to one another, and at the center of the windshield frame the upper frame parts and the lower frame parts extend out of planar relation to each other. These angular relationships present a problem of interconnecting the parts rigidly in a manner taking advantage of keys and similar units as described herein. These keys are important since they sustain the shape of the frame and the desired position of parts to take stress in all directions so that the frame becomes strong, integrated and rigid. I have found that it is possible to effect joints between the parts through square cutting of the parts at the interlocks as distinguished from mitred cuts. This is accomplished when the angle between two abutting parts is known by making a first saw cut according to that angle. Thereafter all further cuts are made at ninety degrees to that cut. This makes possible a great saving of time and a manifold increase in production with a minimum need for dies and jigs compared to joint structures utilizing mitred joints, as seen in FIGS. 6, 11, 13 and 15. Furthermore such an arrangement reduces the chances of error and of misalignment of the parts which can occur in mitre joint structures. In this connection in a mitred joint structure any slight error of an angle will build up and carry through the entire structure, making correction difficult because exact location of each slight error is not readily detectable.

The manner in which corners are constructed by right-angle cuts is illustrated in FIGS. 16 and 18, wherein the side frame members 31 extend full height of the frame and the upper frame part 33 and bottom frame part 30 have end abutment with the side frame members 31. In preparing the frame members for this assembly, a first cut 110 at a proper angle according to the orientation of the parts is made through flange 64 of the top frame member 33 spaced from the end thereof. The angularity is determined with respect to the adjacent longitudinal edge and also with respect to the adjacent transverse part of the step-forming tube 63. Thereupon, a second cut 111 is made lengthwise in a plane at right-angles to the plane of the cut 110. Finally, the end face of the member 33 is cut in a plane 112 parallel to the cut 110 and perpendicular to the cut 111. A similar procedure is followed in cutting the interfitting end at the upper part of the side member 31, the same being cut at flange 48 and shoulder 47 thereof at right angles to the longitudinal edge thereof and to a depth defining a shoulder part which will abut the cut edges 110 and 111. Then a cut in the plane of cut 112 is formed at right angles to the first cut to bear against the free end of the upper frame member 33. Similar cuts 110, 111 and 112 are formed at the outer end of each bottom frame part 30 and complementary cuts are formed at the lower end of the adjacent side frame member 31. The arrangement is such that the keys 71 and 73 may be utilized to anchor together the connected parts.

The construction at the center of the frame is illustrated in FIGS. 17 and 19. In this construction the inner end of each upper frame part 33 and lower frame part 30 is cut in a plane 115 which is carefully calculated to abut the similar plane of the other part and position the end abutting frame parts 33 and the end abutting frame parts 30 at selected angle to one another, both vertically and horizontally. Step cuts 116 and 117 are then formed in the step-forming tube 63 of the upper frame member 33 and in the intermediate shoulder part 38 of the lower frame member 30, with the cuts 116 perpendicular to the plane of the cut 115 and the cut 117 parallel to the plane of the cut 115. A second set of step cuts 118 and 119 is then formed, with cuts 118 parallel to cuts 116, and cuts 119 parallel to cuts 117, the latter being formed in the flanges 64 of the upper frame part 63 and in flange 39 of the lower frame part 30. The center frame part is then cut at both ends with a square cut but with a projecting tongue portion 57' at both ends. The tongue parts 57' are cut in planes to abut the cut surfaces 116, 117. The remaining or marginal portions of the central frame part 32 form shoulders with surfaces which bear against the surfaces 118 and 119. The use of keys 73 and 75 to interconnect the parts 30 and 32, as previously described, completes the structure.

While the preferred embodiments of the invention have been illustrated and described, it will be understood that changes in the construction may be made within the scope of the appended claims without departing from the spirit of the invention.

I claim:
1. A skiff windshield for boats, comprising
   a frame and a windshield panel carried by said frame,
   said frame having two similar sections extending at an angle to each other and comprising a plurality of interconnected frame members of which at least some extend at angles displaced from right angular relationship,
   each frame member having a stepped margin at one face thereof to define a longitudinal shoulder intermediate its width and a second longitudinal shoulder at its margin offset from said first shoulder, similar shoulders of said members being substantially coplanar in each frame section,
   each frame member having a cross-sectional configuration, including a hollow part spaced from said second shoulder and communicating at its ends with the hollow parts of connected frame members,
   each hollow part defining a pair of spaced key-receiving sockets, and
   a key secured in each socket,
   each key spanning the joint between frame members, one key being located adjacent said first shoulder and being substantially L-shaped.
2. The construction defined in claim 1, wherein said frame includes upper, lower, side and central frame members,
   said upper frame members having a top groove, and said lower frame member having a bottom frame groove,
   said grooves open at one of said key sockets, and welds between said upper and lower frame members and the keys adjacent to said grooves.
3. The construction defined in claim 1, wherein the portions of said frame members adjacent said intermediate shoulder and the keys adjacent thereto are staked to said keys at indentations to secure them together.
4. The construction defined in claim 2, and
   a cap strip carried by each upper frame member to span the groove thereof, and
   cooperating ribs on said upper frame members and cap strips interfitting to lock said cap strip on said upper frame member.
5. The construction defined in claim 4, wherein said cap strip includes a top-anchoring longitudinal flange extending downwardly in spaced relation to the outer surface of the upper frame member.
6. The construction defined in claim 5, and
   a clip releasably anchored on said cap strip at selected longitudinal position, and a fastener member carried by said clip.
7. The construction defined in claim 2, and
   a nut slidable in the lower key socket of each lower frame member intermediate the keys secured thereon,
   said nut having a tapped bore communicating with the groove of said lower frame part.
8. The construction defined in claim 1, wherein the ends of said frame members are stepped to interfit with complementary stepped ends of connected frame members,
   said end steps of each member being defined wholly by surfaces perpendicular to adjacent surfaces, the stepped surfaces of at least one frame member at each stepped joint extending at an angle displaced from parallel or perpendicular relation to said frame member.
9. The construction defined in claim 2, wherein the opposite ends of said central frame member include longitudinal central projections and adjacent side shoulders defined by surfaces parallel or perpendicular to each other and angularly displaced to the outer surface of said central frame member, and
   the abutting ends of the upper and lower frame parts are stepped to receive the central projections and adjacent shoulders of said central member.
10. A skiff windshield for boats, comprising
    a marginal frame formed of upper, lower and side members,
    said frame having two similar sections extending at an angle to each other and comprising a plurality of interconnected frame members of which at least some extend at angles displaced from right angular relationship,
    each frame member having a stepped front surface defining an intermediate longitudinal shoulder and an inner longitudinal shoulder,
    one frame member having a longitudinal groove of part-circular form at its outer portion outwardly of said intermediate shoulder, said groove having a flaring mouth,
    a windshield panel having a marginal frame adapted to confront said intermediate shoulder,
    one marginal part of the frame of the windshield panel overlying said intermediate shoulder adjacent and parallel to said groove and having a longitudinal T-slot therein facing and spaced from said intermediate shoulder of said grooved frame member, and
    a hinge member having a longitudinal cylindrical knuckle rotatable in said groove, and
    a longitudinal key slidable endwise and normally retained in said T-slot,
    said windshield panel frame T-slot being open at one end to accommodate connection and disconnection of said windshield panel when said panel is held in position clear of said marginal frame with its T-slot aligned with said key.
11. The construction defined in claim 10, wherein said knuckle and key are spaced apart and laterally offset from a central plate portion of said hinge member,
    said windshield panel frame carrying inwardly projecting sealing strips engaging said intermediate frame member shoulders when the windshield panel is closed.

References Cited by the Examiner

UNITED STATES PATENTS

| | | | |
|---|---|---|---|
| 2,691,803 | 10/1954 | Keebler | 49—397 |
| 2,845,665 | 8/1958 | Place | 49—397 |

FOREIGN PATENTS 638,600  3/1962  Canada.

HARRISON R. MOSELEY, *Primary Examiner.*

KENNETH DOWNEY, *Examiner.*